(12) United States Patent
De Guzman et al.

(10) Patent No.: US 12,555,983 B2
(45) Date of Patent: Feb. 17, 2026

(54) BUSBAR ASSEMBLY AND METHOD OF MAKING

(71) Applicant: Advanced Energy Industries, Inc., Denver, CO (US)

(72) Inventors: Nilo De Guzman, Quezon (PH); Jerome G. Antaran, Paranaque (PH); Mitch Pulon, San Pedro (PH)

(73) Assignee: Advanced Energy Industries, Inc., Denver, CO (US)

( * ) Notice: Subject to any disclaimer, the term of this patent is extended or adjusted under 35 U.S.C. 154(b) by 193 days.

(21) Appl. No.: 18/438,686

(22) Filed: Feb. 12, 2024

(65) Prior Publication Data

US 2025/0260213 A1    Aug. 14, 2025

(51) Int. Cl.
*H02B 1/20* (2006.01)
*H01G 2/02* (2006.01)

(52) U.S. Cl.
CPC ................ *H02B 1/20* (2013.01); *H01G 2/02* (2013.01)

(58) Field of Classification Search
None
See application file for complete search history.

(56) References Cited

U.S. PATENT DOCUMENTS

| | | | |
|---|---|---|---|
| 6,354,846 B1* | 3/2002 | Murakami | H05K 3/301 439/148 |
| 6,530,811 B1* | 3/2003 | Padulo | H01H 73/08 439/82 |
| 2009/0047814 A1* | 2/2009 | Daamen | H01R 13/18 439/251 |
| 2019/0067851 A1* | 2/2019 | Li | H01R 13/629 |

* cited by examiner

*Primary Examiner* — Krystal Robinson

(57) ABSTRACT

A busbar assembly comprises a first busbar having a first surface and a second surface opposite the first surface and having a first lead aperture formed therein. The busbar assembly also comprises a second busbar positioned adjacently to the first busbar and having a third surface and a fourth surface opposite the third surface and having a second lead aperture formed therein. The first busbar comprises an extension element extending from the second surface. The first lead aperture is formed through the extension element. The extension element has a portion thereof extending through the second lead aperture.

20 Claims, 6 Drawing Sheets

BUSBAR ASSEMBLY AND METHOD OF MAKING

TECHNICAL FIELD

Aspects of the disclosure relate to electronic component assembly, and more particularly to a busbar assembly and one or more methods for assembling the busbar assembly.

BACKGROUND

Electronics assembly processes incur time and cost elements to the fabrication of an end product. Some inefficient processes using manual labor can benefit from automation of construction and joining steps to reduce manufacturing time and cost.

SUMMARY

In accordance with one aspect of the present disclosure, a busbar assembly comprises a first busbar having a first surface and a second surface opposite the first surface and having a first lead aperture formed therein. The busbar assembly also comprises a second busbar positioned adjacently to the first busbar and having a third surface and a fourth surface opposite the third surface and having a second lead aperture formed therein. The first busbar comprises an extension element extending from the second surface. The first lead aperture is formed through the extension element. The extension element has a portion thereof extending through the second lead aperture.

In accordance with another aspect of the present disclosure, an electronic component assembly comprises an electronic component and a busbar assembly. The electronic component comprises a body, a first lead extending from the body, and a second lead extending from the body. The busbar assembly comprises a first busbar having first and second lead apertures extending therethrough and a second busbar having third and fourth lead apertures extending therethrough. The first lead extends through the first and third lead apertures. The second lead extends through the second and fourth lead apertures. The first lead aperture extends through the third lead aperture.

In accordance with another aspect of the present disclosure, a method of manufacturing a component assembly comprises aligning a first lead of an electronic component with a first aperture formed in a first busbar and with a second aperture formed in a second busbar, the first aperture extending through the second aperture. The method also comprises aligning a second lead of the electronic component with a third aperture formed in the first busbar and with a fourth aperture formed in the second busbar and inserting the first lead through the first and second apertures, the first lead having a portion thereof extending beyond the first and second apertures. The method further comprises inserting the second lead through the third and fourth apertures, the second lead having a portion thereof extending beyond the third and fourth apertures. The method also comprises electronically coupling the portion of the first lead with the first busbar and electronically coupling the portion of the second lead with the second busbar. The first lead is electronically isolated from the second lead.

BRIEF DESCRIPTION OF THE DRAWINGS

The drawings illustrate embodiments presently contemplated for carrying out the invention.

In the drawings.

Figure 1:
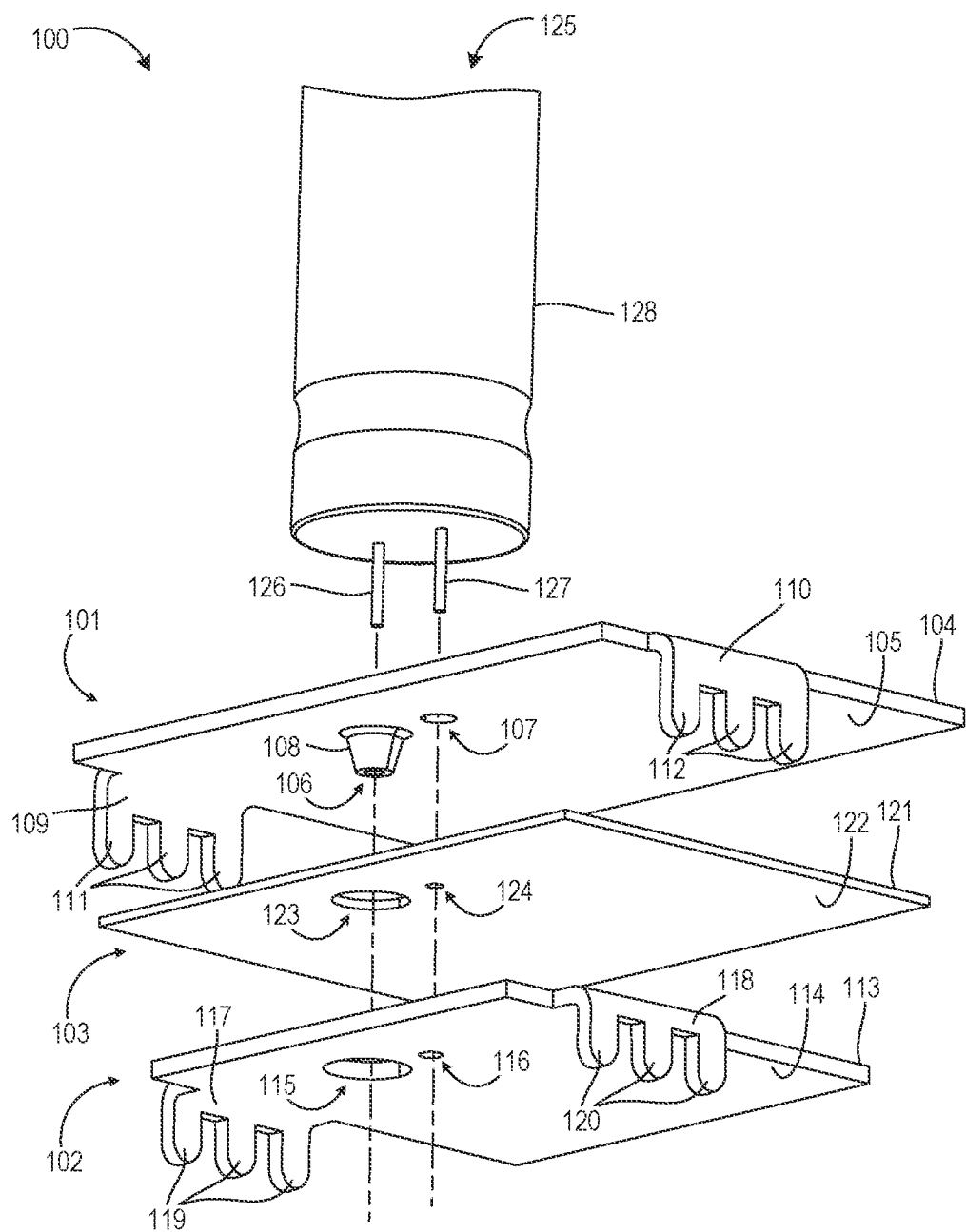
FIG. 1 is an exploded isometric view of a busbar assembly according to one or more embodiments.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 2:
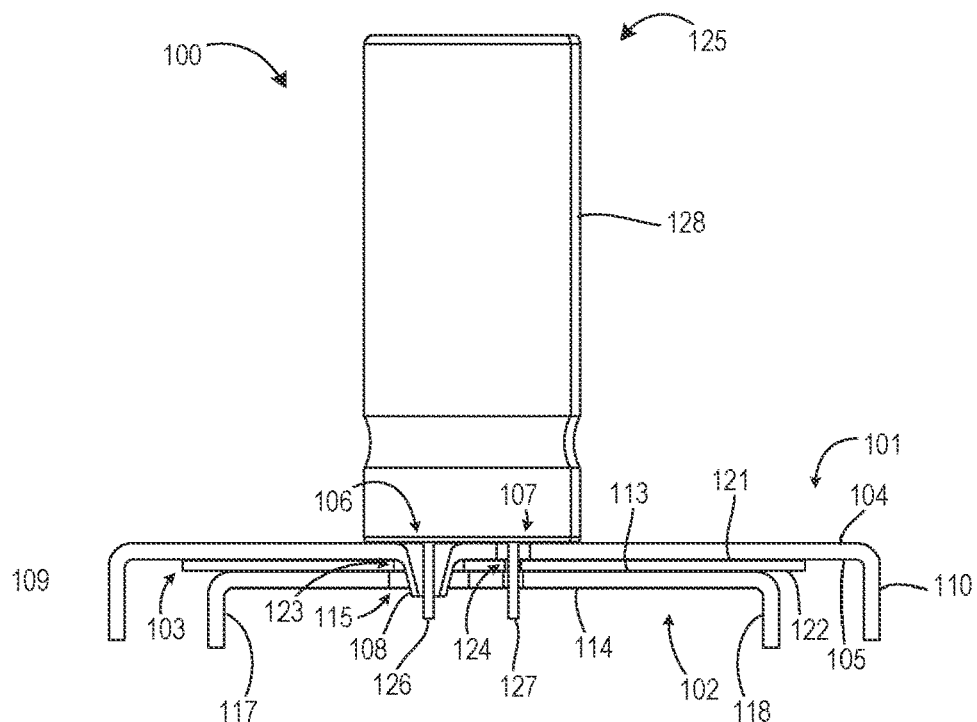
FIG. 2 is a side plan view of the busbar assembly of FIG. 1 according to one or more embodiments.

FIG. 1 illustrates an exploded isometric view of a busbar assembly 100 according to one or more embodiments. FIG. 2 illustrates a side plan view of the busbar assembly 100 according to one or more embodiments. Referring to FIGS. 1 and 2, the busbar assembly 100 includes a first busbar 101, a second busbar 102, and an insulation layer 103 positioned between the first and second busbars 101, 102. The first busbar 101 has a first surface 104 and a second surface 105 opposite the first surface 104. A pair of lead apertures 106, 107 are formed therein to allow passage therethrough of respective component leads as described hereinbelow. An extension element, projection, protuberant member, or protuberance 108 is formed in the first busbar 101 and extends from the second surface 105 in a direction normal to the second surface 105. FIG. 2 illustrates deviations of the first and second surfaces 104, 105 to form the protuberance 108 that surrounds the lead aperture 106. The lead aperture 107 includes passage openings flush with the first and second surfaces 105, 106 in the illustrated embodiment. However, it is contemplated that the lead aperture 107 may be surrounded by an additional protuberance (not shown) extending from the second surface 105 in a similar manner as the protuberance 108.

As shown, on opposite ends of the first busbar 101, leg assemblies 109, 110 formed in the first busbar 101 are bent to extend away from the second surface 105 in a direction substantially parallel to the normal direction of the second surface 105. Each leg assembly 109, 110 has one or more legs 111, 112 useful for attaching and electrically coupling the first busbar 101 to a printed circuit board (PCB) as described hereinbelow.

The second busbar 102 has a first surface 113 and a second surface 114 opposite the first surface 113. A first lead aperture 115 is formed in the second busbar 102 and is aligned with the lead aperture 106 of the first busbar 101 during the assembly and joining process described herein. The protuberance 108 of the first busbar 101 is designed to extend into and through the lead aperture 115 of the second busbar 102 as illustrated in FIG. 2. To eliminate or substantially reduce electrical conductivity between the busbars 101, 102, a diameter of the lead aperture 115 is greater than a diameter of the portion of the protuberance 108 extending through the lead aperture 115. Further, the busbars 101, 102 are separated by the insulation layer 103, which is electrically insulative. While illustrated in FIG. 2 as extending beyond the second surface 114 of the second busbar 102, the protuberance 108 may be flush with the second surface 114 and may even be partially extending into the lead aperture 115 so as to end short of the second surface 114. A second lead aperture 116 is also formed in the second busbar 102 and is aligned with the lead aperture 107 of the first busbar 101 during the assembly and joining process. Two leg assemblies 117, 118 are formed in the second busbar 102 on opposite ends thereof, and each has one or more legs 119, 120 extending in a direction substantially parallel with a normal direction of the second surface 114.

The insulation layer 103 has a first surface 121 and a second busbar 122 opposite the first surface 121. A first lead aperture 123 and a second lead aperture 124 are formed in the insulation layer 103 and are respectively aligned with the lead apertures 106, 115 and 107, 116 during the assembly and joining process.

An electronic component 125 having a pair of component leads 126, 127 extending from a body 128 thereof are aligned with and extend through the lead apertures 106, 107, 115, 116, 123, 124 during the assembly and joining process. As illustrated, the component leads 126, 127 extend from a can-style body 128 in a same direction. However, other types of component bodies and constructions are substitutable within the scope of this disclosure. For example, a radial style body where two leads extend in opposite directions from opposite ends of the body may also be coupled with the busbars 101, 102 with appropriate guidance of the leads into and through the lead apertures 106, 107, 115, 116, 123, 124.

Figure 3:
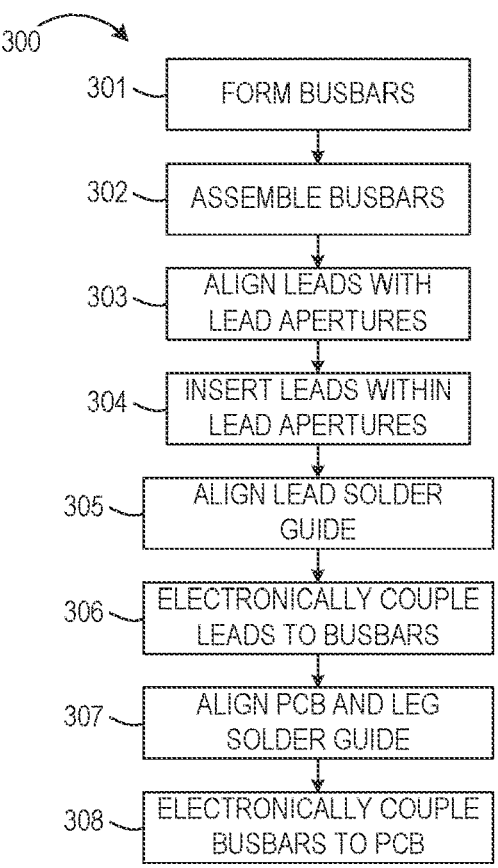
FIG. 3 illustrates a method of manufacturing the busbar assembly of FIGS. 1 and 2 according to one or more embodiments.
Figure 4:
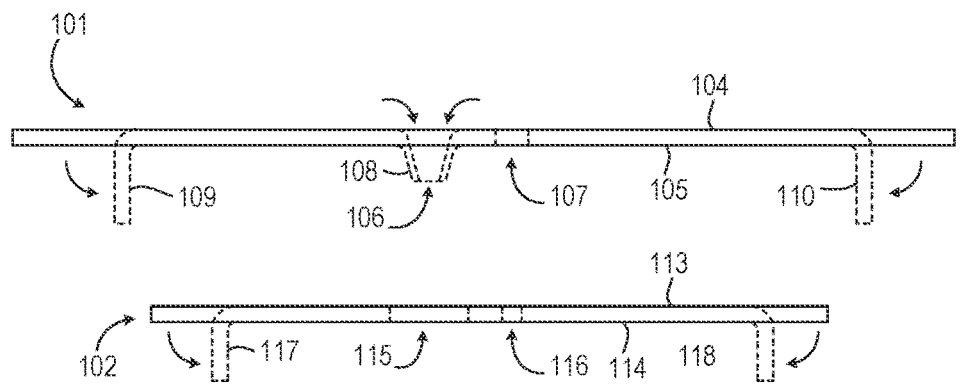
FIGS. 4-13 graphically illustrate portions of the method of FIG. 3 according to one or more embodiments.

FIG. 3 illustrates an assembly method or process 300 of manufacturing the busbar assembly 100 of FIGS. 1 and 2 according to one or more embodiments. In a first method step 301, the first and second busbars 101, 102 are formed. As shown in FIG. 4, the step 301 may include forming the busbars 101, 102 from sheets of electrically conductive material such as copper. The first busbar 101 has the leg assembly 109 and the leg assembly 110 formed by bending opposite ends thereof. The leg assembly bending may also simultaneously create individual legs 111, 112. The lead aperture 106 is formed by creating a via in the copper sheet and bending the first and second surfaces 104, 105 to form the protuberant member 108. The lead aperture 107 may be formed by creating a via in the copper sheet without additional bending of the first and second surfaces 104, 105.

Similarly, the leg assemblies 117, 118 of the second busbar 102 may be formed by bending opposite ends thereof and forming the individual legs 119, 120 thereafter or simultaneously therewith. The lead apertures 115, 116 may be formed by creating vias in the second busbar 102 via drilling or punching, for example. In one embodiment, one or more of the forming steps disclosed above for the first and second busbars 101, 102 may be simultaneously created via a punch.

Figure 5:
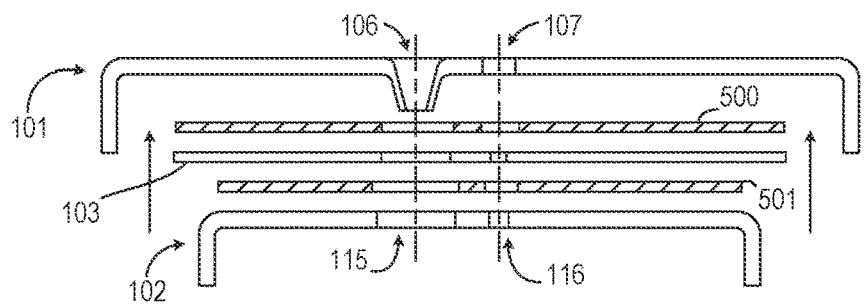
Figure 6:
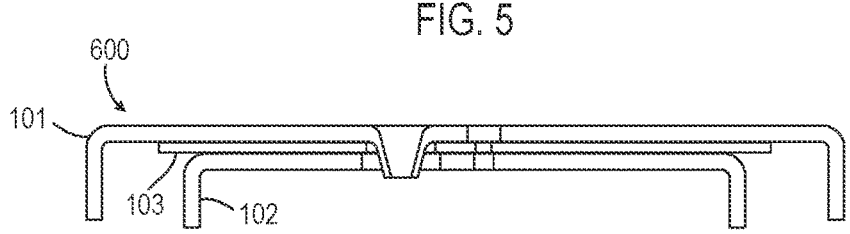

At step 302, the busbars 101, 102 are assembled. FIG. 5 illustrates aligning the first and second busbars 101, 102 to align the lead aperture 106 with the lead aperture 115 and to align the lead aperture 107 with the lead aperture 116. The insulation layer 103 is also aligned with the lead apertures, and adhesive layers 500, 501 may be positioned between the first busbar 101 and the insulation layer 103 and between the insulation layer 103 and the second busbar 102. In this manner, the second surface 105 of the first busbar 101 is adhesively coupled with the first surface 121 of the insulation layer 103, and the second busbar 122 of the insulation layer 103 is adhesively coupled with the first surface 113 of the second busbar 102. Alternatively, the first and second busbars 101, 102 and the insulation layer 103 may be abutted adjacently to each other without adhesive. FIG. 6 illustrates the coupled busbar assembly 600 of the first and second busbars 101, 102 and the insulation layer 103. While FIGS. 6-13 illustrate the busbar assembly without illustrating the adhesive layers 500, 501 for clarity, it is understood that the adhesive layers 500, 501 may be present.

Figure 7:
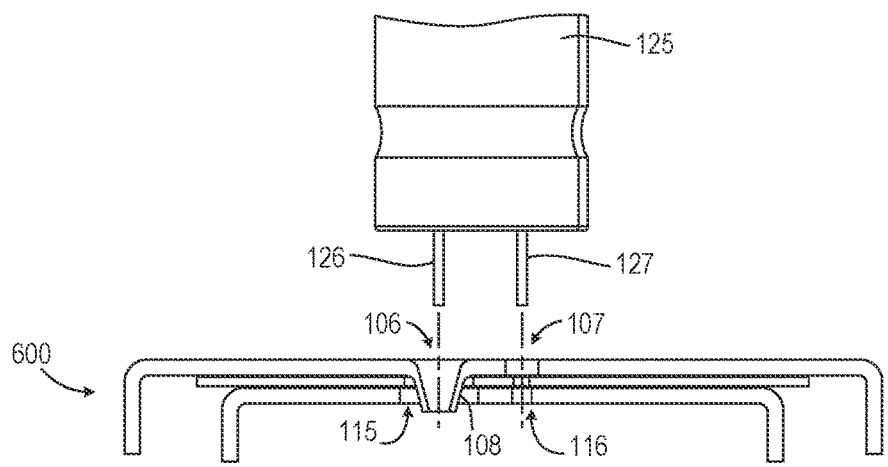
Figure 8:
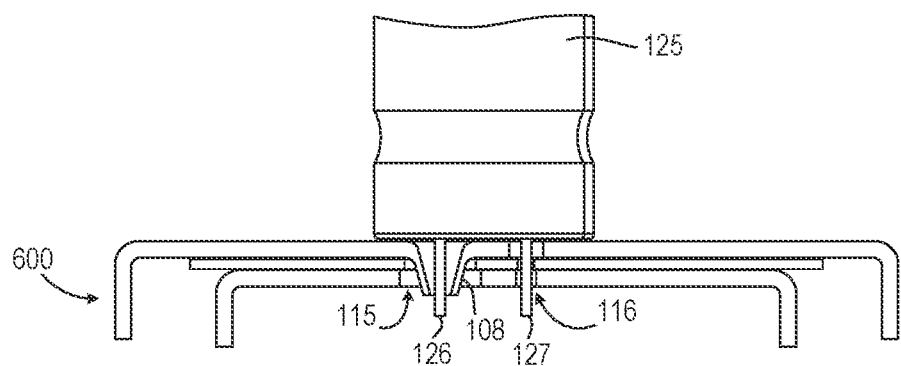

Returning to FIG. 3, assembly of the busbar assembly continues at step 303 with the alignment of the component leads with the respective lead apertures in the busbar assembly. For example, FIG. 7 illustrates aligning the component lead 126 of the electronic component 125 with the lead aperture 106 of the first busbar 101. Since the lead aperture 106 is aligned with the lead aperture 115 of the second busbar 102, the component lead 126 is aligned with both. The component lead 127 is also aligned with the lead apertures 107, 116 of the first and second busbars 101, 102. If the component leads are not of the correct length, they may additionally be cut to size in step 303. At step 304 and as illustrated in FIG. 8, the gap between the electronic component 125 and the first busbar 101 is reduced by inserting the component leads 126, 127 into the lead apertures 106, 107, 116.

Figure 9:
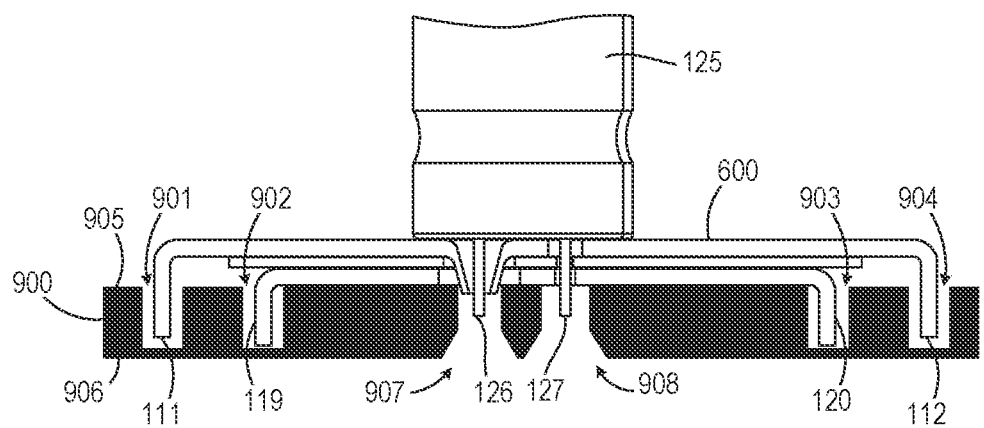
Figure 10:
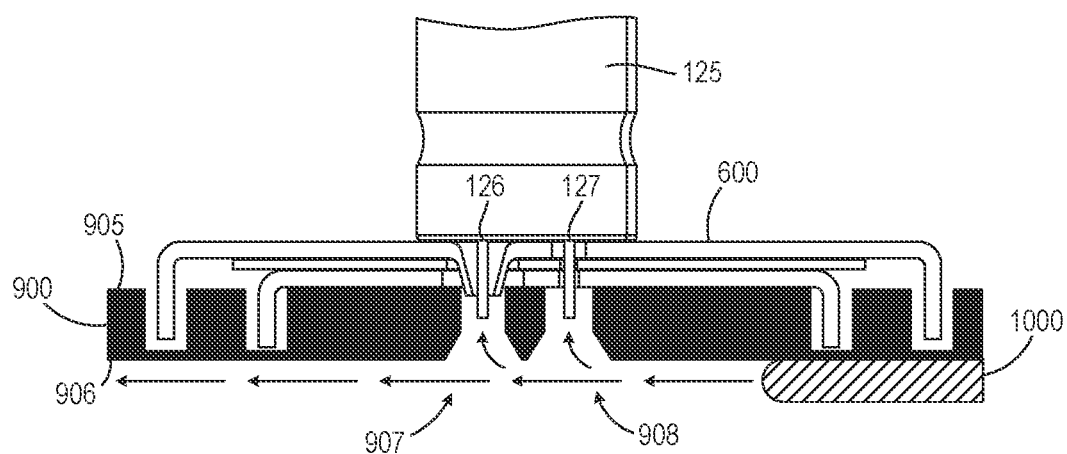

The assembly method 300 proceeds at step 305 with the alignment of a lead solder guide 900 with the coupled busbar assembly 600. FIG. 9 illustrates the lead solder guide 900 having a plurality of leg cavities 901, 902, 903, 904 in a top surface 905 thereof. The leg cavities 901-904 extend toward a bottom surface 906 of the lead solder guide 900 and are aligned with the one or more legs extending from the edge portions of the first and second busbars 101, 102 of the coupled busbar assembly 600. The depth of the leg cavities 901-904 from the top surface 905 is less than the depth of the lead solder guide 900 between the top and bottom surfaces 905, 906. In this manner, the bottom surface 906 of the lead solder guide 900 is unbroken in the area of each leg cavity 901-904 so that solder flowing along the bottom surface 906 does not flow into the leg cavities 901-904.

The lead solder guide 900 includes a pair of solder vias 907, 908 formed through the lead solder guide 900 from the top surface 905 to the bottom surface 906 to allow solder flowing along the bottom surface 906 to flow therein. As shown, the openings of the solder vias 907, 908 in the bottom surface 906 may be larger than the openings of the solder vias 907, 908 in the top surface 905. Thus, the solder vias 907, 908 may be formed in a filter-type shape. The shapes of the solder vias 907, 908 promote the flow of solder into the solder vias 907, 908 for coupling the coupled busbar assembly 600 to the component leads 126, 127.

Figure 11:
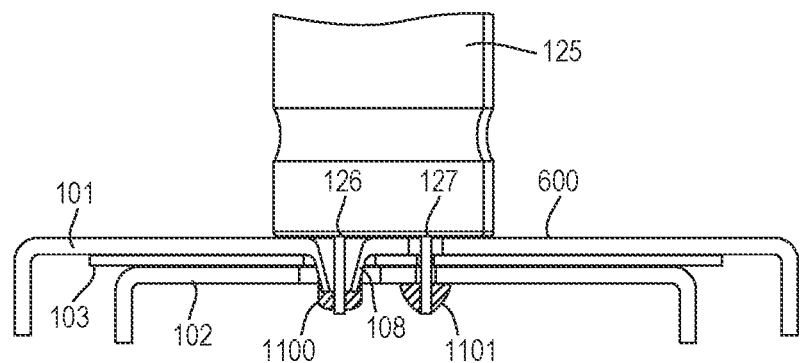

At step 306 of the assembly method 300 of FIG. 3, the component leads 126, 127 of the electronic component 125 are electrically coupled with the coupled busbar assembly 600. In one embodiment illustrated in FIG. 10, liquid solder 1000 is introduced to the bottom of the lead solder guide 900 and is allowed to flow along the bottom surface 906. In one embodiment, the liquid solder 1000 is introduced via a wave soldering process. For example, the coupled busbar assembly 600 and the lead solder guide 900 may be brought adjacent to and passed along a pan of molten solder. As the solder 1000 flows past the solder vias 907, 908, a portion thereof flows into the solder via cavities 907, 908. In the solder via 907, the solder portion contacts the protuberance 108 of the first busbar 101 and the first component lead 126 of the electronic component 125. In the solder via 908, the solder portion contacts the component lead 127 and a portion of the second busbar 102 adjacent to the lead aperture 116. In this manner (as illustrated in FIG. 11), a first solder connection 1100 electrically coupling the component lead 126 to the first busbar 101 via the protuberance 108 is formed, and a second solder connection 1101 electrically coupling the component lead 127 to the second busbar 102 is formed. Thus, in a single soldering process, the component leads 126, 127 are electrically coupled to their respective busbars 101, 102, and manufacturing efficiency over a manual process of separately coupling the component leads 126, 127 to their respective busbars 101, 102 is gained.

Figure 12:
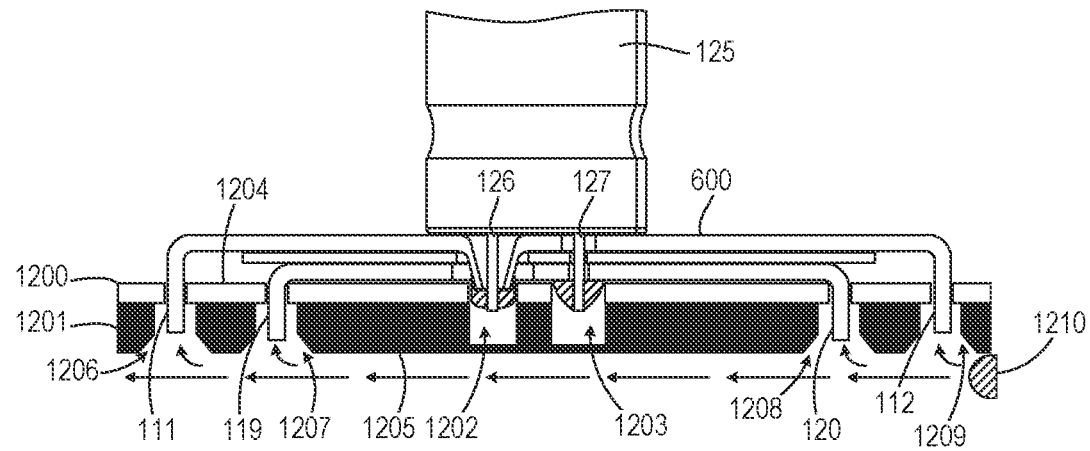

Referring to FIGS. 3 and 12, a PCB 1200 and a leg solder guide 1201 are positioned adjacently to the coupled busbar assembly 600 and aligned with the legs 111, 112, 119, 120 at step 307 of the assembly process 300. The leg solder guide 1201 has a plurality of lead cavities 1202, 1203 in a top surface 1204 thereof that are respectively aligned with the component leads 126, 127 of the electronic component 125. The lead cavities 1202, 1203 extend toward the bottom surface 1205 of the leg solder guide 1201 but do not open out to the bottom surface 1205. In this manner, the bottom surface 1205 of the leg solder guide 1201 is unbroken so that additional solder does not flow about the component leads 126, 127.

A plurality of solder vias 1206, 1207, 1208, 1209 formed through the leg solder guide 1201 from the top surface 1204 to the bottom surface 1205 to allow solder flowing along the bottom surface 1205 to flow therein. The openings of the solder vias 1206-1209 in the bottom surface 1205 are larger than the openings in the top surface 1204. Thus, filter-shaped vias solder vias 1206-1209 may be formed.

Figure 13:
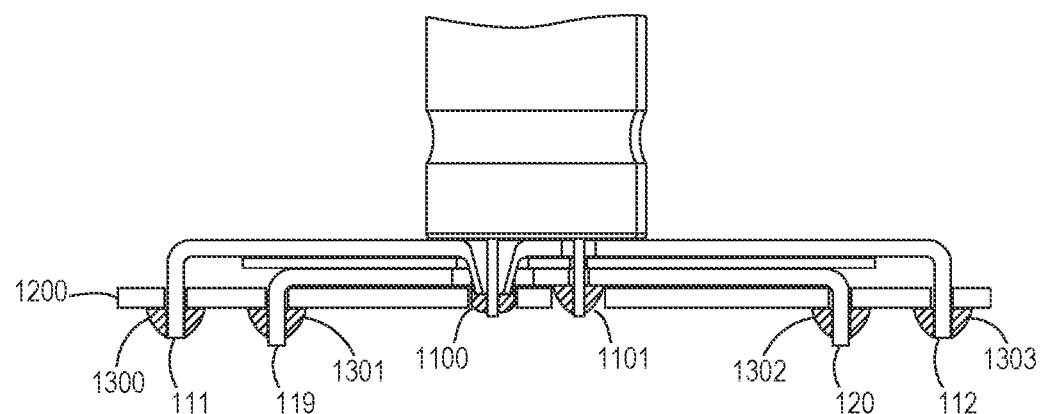

At step 308, liquid solder 1210 is introduced to the bottom of the leg solder guide 1201 and is allowed to flow along the bottom surface 1205 in a wave soldering process as described hereinabove. In this manner (as illustrated in FIG. 13), PCB solder connections 1300, 1301, 1302, 1303 are formed that electrically couple the legs 111, 112, 119, 120 and the busbars 101, 102 to the PCB 1200.

Figure 14:
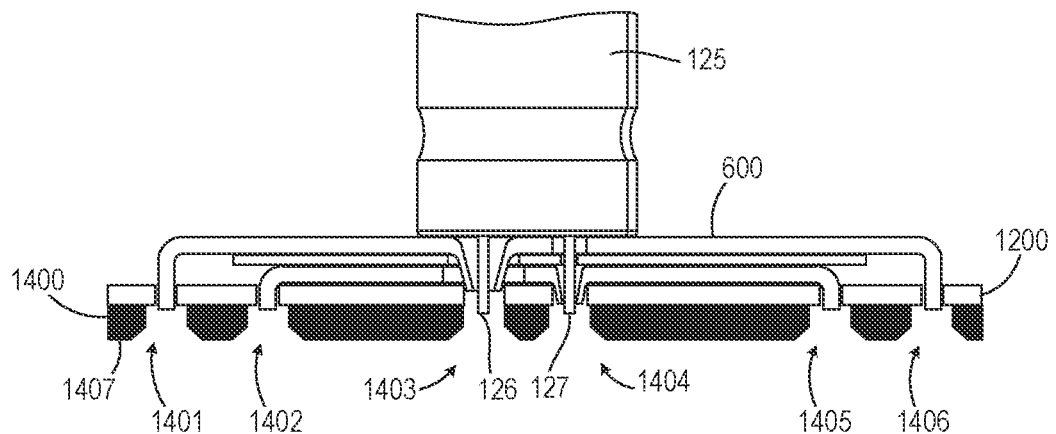
FIGS. 14-16 graphically illustrate an alternate soldering method according to one or more embodiments.
Figure 15:
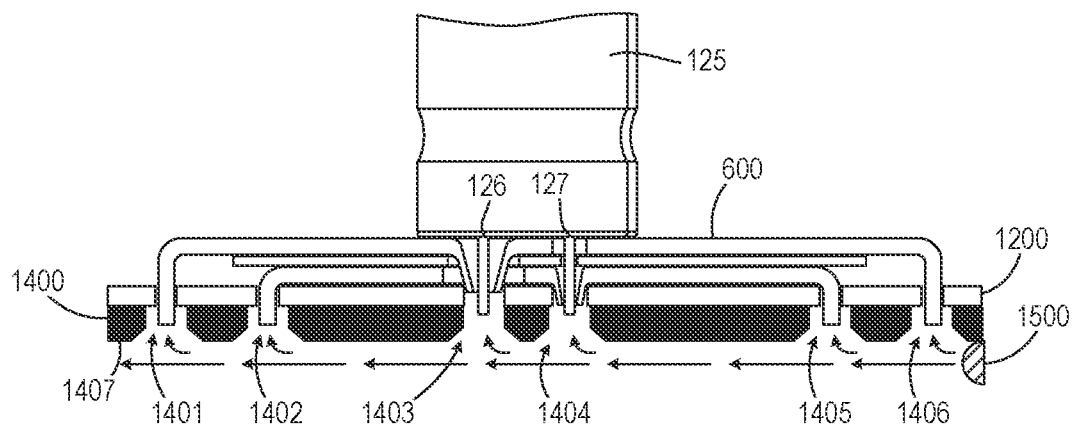
Figure 16:
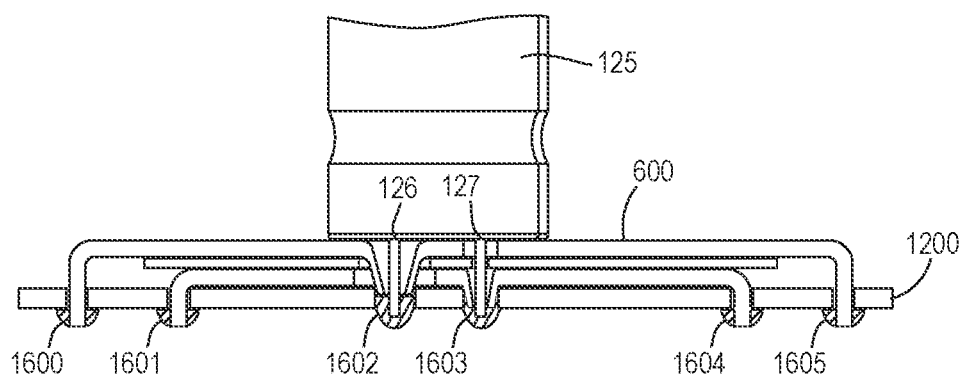

FIGS. 14-16 graphically illustrate an alternate soldering method according to one or more embodiments. As discussed above, separate soldering steps are used for the component leads 126, 127 and for the legs 111, 112, 119, 120 (see, for example, FIGS. 10 and 12). FIG. 14 illustrates a solder guide 1400 used to simultaneously solder the component leads 126, 127 to the respective first and second busbars 101, 102 and the legs 111, 112, 119, 120 to the PCB 1200. The solder guide 1400 has a plurality of solder cavities 1401, 1402, 1403, 1404, 1405, 1406 aligned with the first and second busbars 101, 102 and the legs 111, 112, 119, 120 together with their respective openings in the PCB 1200. The solder cavities 1401-1406 form a funnel shape.

As shown in FIG. 15, solder 1500 is introduced to the bottom of the solder guide 1400 and is allowed to flow along a bottom surface 1407 thereof in a wave soldering process, for example. Similar to that described hereinabove, PCB solder connections 1600-1605 as illustrated in FIG. 16. The method steps illustrated in FIGS. 14-16 thus allow for simultaneous wave soldering connections to be made. In this manner, further efficiencies may be achieved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A busbar assembly comprising:
   a first busbar having a first surface and a second surface opposite the first surface and having a first lead aperture formed therein; and
   a second busbar positioned adjacently to the first busbar and having a third surface and a fourth surface opposite the third surface and having a second lead aperture formed therein;
   wherein the first busbar comprises an extension element extending from the second surface;
   wherein the first lead aperture is formed through the extension element; and
   wherein the extension element has a portion thereof extending through the second lead aperture.

2. The busbar assembly of claim 1, wherein a diameter of the second lead aperture is greater than a diameter of the portion of the extension element extending therethrough.

3. The busbar assembly of claim 1, wherein the first and second busbars are electrically conductive.

4. The busbar assembly of claim 3 further comprising an insulation member positioned between the first and second busbars.

5. The busbar assembly of claim 4 further comprising:
   a first adhesive layer adhesively joining the second surface of the first busbar and the insulation member; and
   a second adhesive layer adhesively joining the third surface of the second busbar and the insulation member.

6. The busbar assembly of claim 1, wherein the first busbar has a third lead aperture formed therein;
   wherein the second busbar has a fourth lead aperture formed therein; and
   wherein the third and fourth lead apertures are aligned.

7. The busbar assembly of claim 1, wherein the extension element extends beyond the fourth surface of the second busbar.

8. The busbar assembly of claim 1, wherein an outer surface of the extension element comprises an extension of the second surface punched in a direction normal to the second surface.

9. An electronic component assembly comprising:
an electronic component comprising:
a body;
a first lead extending from the body; and
a second lead extending from the body;
a busbar assembly comprising:
a first busbar having first and second lead apertures extending therethrough; and
a second busbar having third and fourth lead apertures extending therethrough;
wherein the first lead extends through the first and third lead apertures;
wherein the second lead extends through the second and fourth lead apertures; and
wherein the first lead aperture extends through the third lead aperture.

10. The electronic component assembly of claim 9 further comprising a projection extending from a bottom surface of the first busbar;
wherein the projection forms the first lead aperture and extends through the third lead aperture.

11. The electronic component assembly of claim 9, wherein the first lead is electronically coupled with the first busbar;
wherein the second lead is electronically coupled with the second busbar; and
wherein the first busbar is electronically isolated from the second busbar.

12. The electronic component assembly of claim 11, wherein the first lead is electronically coupled with the first busbar via a first solder connection;
wherein the second lead is electronically coupled with the second busbar via a second solder connection; and
wherein the first and second solder connections are formed via a wave soldering process.

13. The electronic component assembly of claim 11 further comprising an electrical insulation layer positioned between the first and second busbars.

14. The electronic component assembly of claim 9, wherein the electronic component comprises a capacitor.

15. A method of manufacturing a component assembly comprising:
aligning a first lead of an electronic component with a first aperture formed in a first busbar and with a second aperture formed in a second busbar, the first aperture extending through the second aperture;
aligning a second lead of the electronic component with a third aperture formed in the first busbar and with a fourth aperture formed in the second busbar;
inserting the first lead through the first and second apertures, the first lead having a portion thereof extending beyond the first and second apertures;
inserting the second lead through the third and fourth apertures, the second lead having a portion thereof extending beyond the third and fourth apertures;
electronically coupling the portion of the first lead with the first busbar; and
electronically coupling the portion of the second lead with the second busbar;
wherein the first lead is electronically isolated from the second lead.

16. The method of claim 15 further comprising forming a protuberant member in the first busbar;
wherein the first aperture extends through the protuberant member.

17. The method of claim 16, wherein electronically coupling the portion of the first lead with the first busbar comprises soldering the portion of the first lead with the protuberant member via a wave soldering process; and
wherein electronically coupling the portion of the second lead with the second busbar comprises soldering the portion of the second lead with a portion of the second busbar surrounding the second aperture via the wave soldering process.

18. The method of claim 17, further comprising:
forming one or more legs extending from an edge portion of the first busbar; and
forming one or more legs extending from an edge portion of the second busbar.

19. The method of claim 18 further comprising:
soldering the one or more legs extending from the edge portion of the first busbar to a printed circuit board; and
soldering the one or more legs extending from the edge portion of the second busbar to the printed circuit board.

20. The method of claim 16 further comprising positioning a first solder guide adjacently to the second busbar prior to soldering the portions of the first and second leads;
wherein the first solder guide comprises:
a first surface;
a second surface opposite the first surface;
a first solder via formed therethrough from the first surface to the second surface and aligned with the protuberant member;
a second solder via formed therethrough from the first surface to the second surface and aligned with the second lead;
one or more first leg cavities formed in the first surface and extending toward the second surface and aligned with the one or more legs extending from the edge portion of the first busbar; and
one or more second leg cavities formed in the first surface and extending toward the second surface and aligned with the one or more legs extending from the edge portion of the second busbar;
wherein a depth of the first and second leg cavities is less than a distance between the first and second surfaces of the first solder guide.

* * * * *